Jan. 31, 1967 W. W. FREMPTER 3,301,493

LIQUID DISCHARGE

Filed Aug. 5, 1965

INVENTOR
WAYNE W. FREMPTER
BY Christie, Parker & Hale
ATTORNEYS.

United States Patent Office 3,301,493
Patented Jan. 31, 1967

3,301,493
LIQUID DISCHARGE
Wayne W. Frempter, Burbank, Calif., assignor to Rain Jet Corporation, Burbank, Calif., a corporation of California
Filed Aug. 5, 1965, Ser. No. 477,526
14 Claims. (Cl. 239—590)

This invention relates generally to the art of discharging liquids in a spray of discrete droplets. More particularly, this invention relates to liquid discharge devices having no moving parts, and which produce a spray of liquid droplets uniformly over a wide area.

United States Patent 3,082,961, issued on March 26, 1963, to John O. Hruby, Jr., and assigned to the assignee of the present invention, discloses a liquid discharge device which relies upon the reverberation of a mixture of liquid and air in a chamber of the device to produce a pulsating discharge of liquid and air through an outlet opening from the chamber. Devices in accord with this patent have many areas of utility such as, by way of example rather than limitation, in nuclear fallout washdown systems, industrial nozzles, sewage aeration nozzles, and lawn sprinklers. In many of these applications, such as in sewage aeration nozzles, the principal benefit provided by devices in accord with Patent 3,082,961 is that efficient aeration of the liquid discharge is provided by a device having no moving parts; uniform distribution of the discharged liquid over a selected area is not necessary in most cases. On the other hand, where a device in accord with Patent 3,082,961 is to be used as a lawn sprinkler, for example, it is desired, for obvious reasons, that the liquid discharged be distributed as uniformly as possible over a selected area of the lawn.

It has been discovered that devices constructed in accord with the illustrations of Patent 3,082,961 do not produce a uniform distribution of liquid over an area adjacent the device. I have found that by providing a baffle in the chamber and by suitably sizing and positioning the baffle relative to the outlet opening, the uniformity of droplet distribution over an area adjacent the device relative to the distribution of droplets over an area spaced away from the device is improved.

Generally speaking, this invention provides a liquid discharging device comprising a body defining an inside chamber having opposite ends spaced apart by the length of the chamber. A liquid inlet opening is formed through the body to the chamber substantially at one end of the chamber. The body defines walls for the chamber and a liquid outlet opening laterally from the chamber at a location along the chamber spaced from the ends. The outlet opening has a minimum area greater in extent than the area of the inlet opening. Also, a baffle is extended within the chamber from the other end of the chamber toward the outlet opening.

The above mentioned and other features of the invention are more fully set forth in the following detailed description of the invention, which description is presented in conjunction with the accompanying drawing, wherein.

Figure 2:
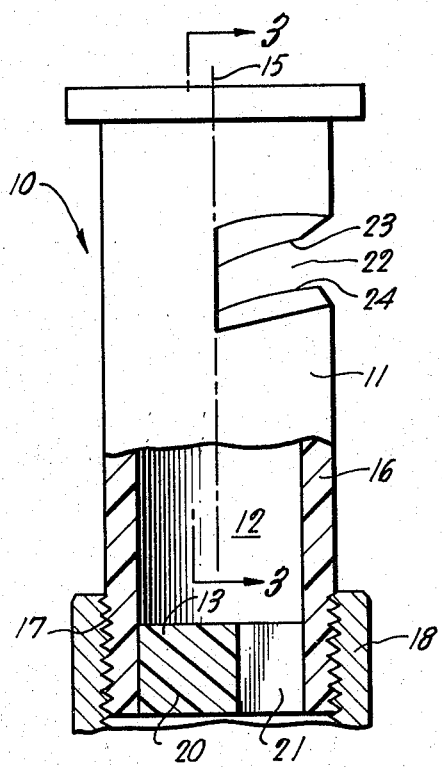
FIG. 2 is a side elevation view, with parts broken away, of the device shown in FIG. 1.
Figure 3:
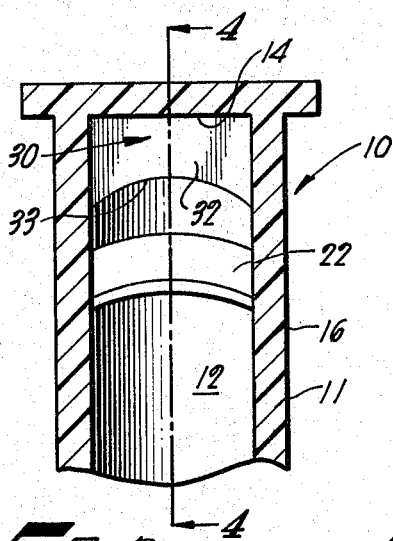
Figure 4:
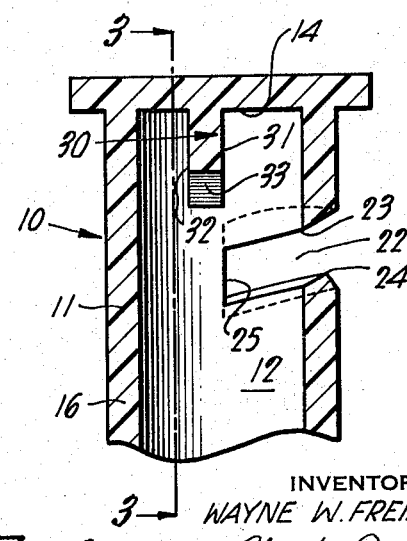

FIG. 3 is a cross-sectional elevation view taken along lines 3—3 of FIGS. 2 and 4; and FIG. 4 is a cross-sectional elevation view taken along lines 4—4 of FIG. 3.

Figure 1:
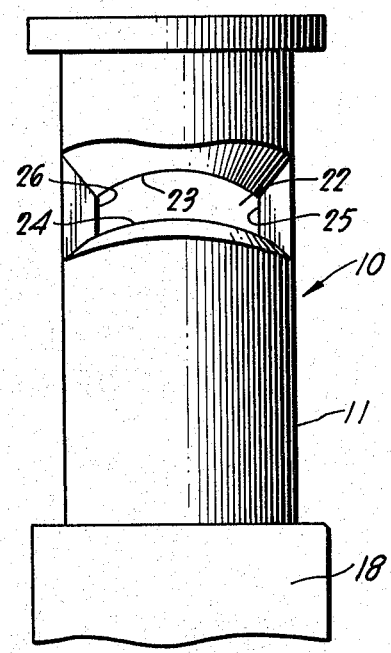
FIG. 1 is a front elevation view of a liquid discharging device according to this invention.

FIGS. 1 and 2 illustrate a water discharging and distributing device 10 according to this invention. The device is particularly adapted for use as a sprinkling head in an underground lawn sprinkling system. The device includes a body 11 defining an interior chamber 12 having opposite end surfaces 13 and 14 (see FIGS. 2–4) spaced apart along an axis 15 of the chamber by the length of the chamber. The body defines walls 16 of the chamber. One end of the body, along the exterior thereof, is externally threaded as at 17 so that the body is adapted to be connected in liquid flow relation to a liquid supply duct (not shown), such as a riser pipe in an underground lawn sprinkling system, by means of an internally threaded collar 18.

Body 11 has a circularly cylindrical tubular configuration, and chamber end surfaces 13 and 14 are disposed normal to the axis of the chamber. Preferably, except to the extent illustrated, the walls of the chamber are of uniform thickness. It is to be understood, however, that device 10 is one of several presently preferred embodiments of this invention and has been selected for illustration in the accompanying drawing merely as a vehicle for presenting the benefits provided by this invention. Workers skilled in the art to which this invention relates will appreciate that chamber 12 need not be of right circularly cylindrical configuration, that the chamber end surfaces need not be normal to the length of the chamber, and that the chamber walls may be of non-uniform thickness. It is preferred, however, that the wall surfaces which define the limits of the chamber be smoothly contoured along the length of the chamber.

Chamber end surface 13 is defined by a plug 20 fixedly mounted in the body adjacent the threaded end of the body. The plug defines a fluid inlet opening 21 into the chamber. The inlet opening preferably is provided by a notch formed in the periphery of the plug, which notch also extends through the thickness of the plug. The body, at a location spaced between the end surfaces of the chamber, defines a liquid discharge or outlet opening 22 laterally from the chamber. The outlet opening has a minimum area (preferably the area of the outlet opening at the inner surfaces of walls 16) which is greater in extent than the area of the liquid inlet opening.

As shown in FIGS. 1 and 2, the outlet opening has a greater extent transversely of the chamber than it has along the elongate extent of the chamber. It is to be noted again, however, that the device shown in FIGS. 1 and 2 is only of several presently preferred embodiments of the invention; the invention also contemplates that the outlet opening may be formed so as to have a greater extent along the length of the chamber than it has transversely of the chamber. Where the outlet opening is wider than it is long, as in device 10, it is preferred, for best liquid discharging performance of the device, that inlet opening 21 be located eccentrically of chamber axis 15. In device 10, inlet opening 21 is located eccentric of axis 15 in the same direction from the axis as the center of area of outlet opening 22, and is centered on a plane which bisects the transverse extent of outlet opening 22. The entire area of the inlet opening is located within the cylinder defined by the inner surfaces of walls 16.

Preferably outlet opening 22 of device 10 is configured as illustrated. It is to be understood, however, that such configuration of the contour of the body around the periphery of the outlet opening is not critical to this invention, but is preferred so that the maximum benefit of the invention may be realized.

The outlet opening has an upper edge 23 adjacent chamber end surface 14 and a lower edge 24 adjacent chamber end surface 13. The outlet opening also has ends 25 and 26 which are spaced apart from each other a selected distance around the circumference of the body. In device 10, the outlet opening ends are spaced diametrically opposite each other across chamber 12 so that the outlet opening subtends an arc of 180° around the chamber. The extent of the arc subtended by the outlet opening is not critical to this invention, however; devices wherein the outlet opening subtends an arc of 90° have been constructed and operated successfully. Where the outlet opening has a greater extent transversely of the chamber than it has along the chamber, as in device 10, it is desired that edge 23 of the outlet opening be spaced from end surface 14, and similarly that edge 24 be spaced from end surface 13, by a distance no less than one-fourth the largest transverse dimension of the chamber.

The device 10, to the extent described above, is in accord with the description of Patent 3,082,961. When water is supplied to the device, the device operates to discharge discrete droplets of water over a semi-circular area adjacent the device; the device is located at the midpoint of the boundary diameter of the area. The device operates to produce a pulsating discharge of water droplets. The droplets emerge from the device in a fan-shaped array, but the plane of this array flutters or pivots randomly about an imaginary, substantially horizontal axis within the device. Because of this random flutter action, the water droplets are distributed substantially uniformly over the semi-circular area. It is believed that this random flutter action is produced by an interaction, akin to reverberation, of water and air within that portion of chamber 12 which lies above outlet opening 22. It is believed that water introduced into the chamber through inlet opening 21 compresses a quantity of air in the upper portion of the chamber as operation of the device is first commenced. This pocket of air is believed to act as an imaginary baffle to cause the plane of the fan-shaped droplet array to assume a given attitude relative to axis 15. The trapped air pocket, however, is not stable and moves about in the chamber. Moreover, the air pocket changes volume and periodically breaks down, only to be re-established substantially immediately by air drawn into the chamber through the outlet opening. These alterations in the combustion of the air pocket take place repeatedly, and, thus, the attitude of the plane of the fan-shaped droplet array relative to axis 15 is repeatedly varied. The discharge of water from the device is violent, and this violence produces the discrete droplets referred to above. In fact, the flutter in the water discharge is so violent that the planar nature of the droplet pattern at any instant is more theoretical than actual; the characterization of the droplet array as "planar" has been made herein merely for the purposes of explaining the operation of device 10.

As noted above, it has been found that a device constructed in accord with Patent 3,082,961 results in the distribution of less water immediately adjacent the device than more remotely from the device. This non-uniform distribution characteristic is undesirable when such devices are used in lawn sprinkling systems, for example. To improve the droplet distribution characteristic in areas close to the device, and to render the distribution of droplets more uniform over the entire area covered by the device, a baffle 30 is provided in chamber 12. The baffle is formed integral with body 11 and extends from chamber end surface 14 into the chamber toward outlet opening 22. The baffle has a front surface 31 disposed toward the outlet opening and a rear surface 32 spaced from the walls of the chamber opposite the chamber from the outlet opening and disposed parallel to surface 31. Surfaces 31 and 32 extend across the chamber as shown in FIGS. 3 and 4. The baffle has a lower edge 33 which is spaced between chamber end surface 14 and the upper edge of the outlet opening. Preferably, as shown in FIG. 3, baffle edge 33 has a circular curvature concave toward chamber end surface 13. The radius of curvature of the baffle edge is greater than the radius of chamber 12. Preferably baffle front surface 31 is planar and the baffle is positioned in the chamber so that axis 15 lies in the plane of the surface. It is also preferred that the planes of surfaces 31 and 32 lie normal to the plane which bisects the extent of outlet opening 22 transversely of chamber 12.

In a presently preferred device in accord with the foregoing description, chamber 12 has a diameter of 0.250 inch, and the distance between baffle surfaces 31 and 32 is 0.050 inch. The distance between chamber end surface 14 and baffle surface 33 at the intersections of surface 33 with the chamber walls is 0.150 inch. The radius of curvature of surface 33 is 0.156 inch. The minimum spacing between chamber end surface 14 and edge 23 of the outlet opening is approximately 0.234 inch. It is to be understood, however, that these dimensions apply to a presently preferred embodiment of the invention. It is, therefore, to be understood that these dimensions in the positioning of the baffle element relative to the outlet opening may be varied without departing from the scope of this invention.

It has been found that when a device is accord with Patent 3,082,961 is provided with an internal baffle like that described above, the distribution of water droplets over the area covered by the discharge pattern from the device is rendered more uniform. Specifically, more droplets are deposited over the portion of the watered area closest to a baffled device than are deposited in the same area by an otherwise identical unbaffled device. It is believed that this improvement is produced by causing the air bubble referred to above to be confined to the area of the chamber which lies directly above and over the center of the outlet opening. The positional control over the bubble apparently has an effect on the flow of water along the inner surfaces of the chamber opposite the outlet opening. It is preferred, however, that there be a space between the side of the baffle opposite from the outlet opening and the surface of the chamber diametrically opposite the outlet opening for optimum performance of the device.

The performance of device 10 can be altered by varying any one or combination of the following characteristics of device 10: the position of the baffle along a radial plane bisecting the transverse extent of the outlet opening, the proximity of the lower edge of the baffle to the edge of the outlet opening closest to chamber end surface 14, the curvature of the lower edge of the baffle, the spacing between the rear surface of the baffle and the adjacent surfaces of the chamber, and the distance between baffle surfaces 31 and 32.

There has been described above a simple, effective and efficient water discharging and distributing device which has no moving parts and which is, therefore, extremely reliable. This device may be used for many purposes. In the foregoing description, device 10 has been referred to as a component of an underground lawn sprinking system merely for the purpose of illustrating the utility of the devices in accord with this invention. It will be readily apparent to workers skilled in the art of discharging liquids that device 10 may be used in other ways.

The foregoing description has been presented by reference to certain embodiments of the invention in order that the invention may be most clearly understood rather than by way of limiting the invention. Workers skilled in the art will appreciate that variations may be made both in the structure described and in the dimensions presented without departing from the scope of the invention, or from the following claims which define the invention.

What is claimed is:

1. A liquid discharging device comprising a hollow body defining an inside chamber having opposite ends spaced apart by the length of the chamber, a liquid inlet opening to the chamber substantially at one end thereof, the body defining walls for the chamber and a liquid outlet opening laterally from the chamber at a location along the chamber spaced from the ends, the outlet opening having a minimum area greater than the area of the inlet opening, and a baffle extended within the chamber from the other end thereof toward but not to the outlet opening and occupying only a portion of the volume of the chamber between the outlet opening and said other end of the chamber.

2. A lawn sprinkler head and the like comprising a hollow body defining an inside chamber having an elongate extent between opposite ends thereof greater than its transverse extent, the body being adapted for connection to a liquid supply duct adjacent one end of the chamber, said one end defining inlet opening means to said chamber within the periphery of the chamber at said one end, the body having a single outlet opening through the side walls from the chamber, the outlet opening being larger in area than the inlet opening means and spaced between the ends of the chamber, the extent of the opening transversely of the chamber being greater than the extent of the opening along the elongate extent of the chamber, and a baffle extended within the chamber from the other end thereof toward but not to the outlet opening and occupying only a portion of the volume of the chamber between the outlet opening and said other end of the chamber.

3. A lawn sprinkler head and the like comprising a hollow body defining an inside chamber having an elongate extent between opposite ends thereof greater than its transverse extent, one end of the chamber defining liquid inlet opening means to said chamber within the periphery of the chamber, the body having a single outlet opening through the side walls from the chamber, the outlet opening being larger in area than the inlet opening means and spaced between the ends of the chamber, the extent of the outlet opening transversely of the chamber between opposite ends of the outlet opening being greater than the extent of the outlet opening along the elongate extent of the chamber, and a baffle extended within the chamber from the other end thereof toward the outlet opening, the baffle extending across the interior of the chamber parallel to a line passing through the ends of the outlet opening and being spaced from the interior surfaces of the chamber adjacent to and opposite from the outlet opening.

4. A lawn sprinkler head and the like comprising a hollow body defining an inside chamber having smoothly curved side walls and an elongate extent between opposite ends thereof greater than its transverse extent, the body being adapted for connection to a liquid supply duct adjacent one end of the chamber, said one end defining a fixed inlet opening to said chamber within the circumference of the chamber, the body having a single outlet opening through the side walls from the chamber larger in size than the inlet opening and spaced between the ends of the chamber, the outlet opening being symmetrical about a plane passing through the chamber parallel to the elongate extent of the chamber, the extent of the outlet opening transversely of the chamber between opposite ends of the outlet opening being greater than the extent of the outlet opening along the elongate extent of the chamber, and a baffle extended within the chamber from the other end thereof toward the outlet opening, the baffle extending across the interior of the chamber normal to said plane and being spaced from the interior surfaces of the chamber adjacent to and opposite from the outlet opening.

5. A lawn sprinkler head and the like comprising a hollow body defining an elongated, circularly cylindrical inside chamber having opposite ends disposed substantially normal to the longitudinal axis of the chamber, the body being adapted for connection to a liquid supply duct adjacent one end of the chamber, said one end defining a fixed inlet opening to said chamber, the body having a single outlet opening through the side walls from the chamber larger in size than the inlet opening and spaced between the ends of the chamber near to the other end of the chamber than to the one end, the outlet opening being symmetrical about a radial plane through the chamber and having an extent circumferentially of the chamber greater than its extent axially of the chamber, and a baffle disposed across the interior of the chamber normal to said radial plane and from the other end thereof toward the outlet opening, the baffle having a front face disposed toward the outlet opening and lying along the chamber axis, the baffle having a rear surface spaced from the interior surface of the chamber opposite from the outlet opening.

6. Apparatus according to claim 5 wherein the baffle has an edge spaced from the other end of the chamber and curved concave toward the one end of the chamber.

7. Apparatus according to claim 6 wherein the curvature of the edge of the baffle is circular, and the radius of said curvature is greater than the radius of the chamber.

8. A lawn sprinkler head and the like comprising a hollow body defining a circularly cylindrical elongated inside chamber having opposite ends disposed substantially normal to the axis of the chamber, the body being adapted for connection to a liquid supply duct adjacent one end of the chamber, said one end defining a fixed liquid inlet opening to said chamber eccentric of the longitudinal axis of the chamber, the body having a single outlet opening through the side walls from the chamber larger in size than the inlet opening, the outlet opening being symmetrical about a radial plane through the chamber and having an extent circumferentially of the chamber greater than its extent axially of the chamber, and a baffle disposed across the interior of the chamber normal to said radial plane extended within the chamber from the other end thereof toward the outlet opening in spaced relation to the interior surfaces of the chamber adjacent to and opposite from the outlet opening.

9. Apparatus according to claim 8 wherein the liquid inlet opening is centered on said radial plane.

10. Apparatus according to claim 9 wherein the inlet opening is disposed on the same side of the axis of the chamber as the outlet opening.

11. Apparatus according to claim 8 wherein the opposite ends of the chamber are spaced from the proximate edges of the outlet opening a distance at least as great as one-fourth the diameter of the chamber.

12. Apparatus according to claim 11 wherein the baffle has a front face disposed toward the outlet opening and lying substantially on the axis of the chamber and a rear face spaced from the surface of the chamber opposite from the outlet opening.

13. Apparatus according to claim 12 wherein the baffle has an edge disposed between the outlet opening and the other end of the chamber, the edge being curved in the plane of the baffle concave toward the one end of the chamber.

14. Apparatus according to claim 13 wherein the edge of the baffle has a radius of curvature greater than the radius of the chamber.

References Cited by the Examiner

UNITED STATES PATENTS

| 1,676,035 | 7/1928 | Lehnert | 239—590 |
| 1,978,721 | 10/1934 | Perkins | 239—590 |
| 2,559,592 | 7/1951 | Button et al. | 239—590 |
| 3,082,961 | 3/1963 | Hruby | 239—598 |

M. HENSON WOOD, JR., *Primary Examiner.*

R. S. STROBEL, *Assistant Examiner.*